United States Patent

Holtzhauser et al.

Patent Number: 4,498,515
Date of Patent: Feb. 12, 1985

[54] ONBOARD TIRE INFLATION SYSTEM

[75] Inventors: Joseph C. Holtzhauser, Kalamazoo; Dale L. Kwasniewski, Battle Creek, both of Mich.

[73] Assignee: Eaton Corporation, Cleveland, Ohio

[21] Appl. No.: 538,295

[22] Filed: Oct. 3, 1983

[51] Int. Cl.³ .................... B60C 29/00; B60C 23/16
[52] U.S. Cl. .................... 152/417; 137/224; 137/625.64; 141/46; 141/95; 141/98; 152/427
[58] Field of Search .......... 152/415, 416, 417, 427, 152/429; 137/224, 625.64, 596.18; 251/30; 141/65, 66, 95, 98, 46, 38; 73/146.2, 146.3, 146.4, 146.5

[56] References Cited

U.S. PATENT DOCUMENTS

| | | | |
|---|---|---|---|
| 1,234,962 | 7/1917 | Tarbet | 152/417 |
| 2,989,999 | 6/1961 | Holbrook et al. | 152/416 |
| 3,362,452 | 1/1968 | Harnish | 152/416 |
| 4,434,833 | 3/1984 | Swanson et al. | 152/417 |
| 4,441,539 | 4/1984 | Hulse | 152/417 |

Primary Examiner—William A. Powell
Assistant Examiner—Thomas Bokan
Attorney, Agent, or Firm—C. H. Grace; H. D. Gordon

[57] ABSTRACT

An onboard tire inflation system (10) for controlling and/or monitoring the inflation pressure of a tire (18) from a remote control (22, 24) is provided. The system includes automatic valve means (32, 88) for isolating the interior chamber (20) of the tire and relieving fluid pressure on the rotary seals (78, 80, 82) during system steady state ("off") operating conditions.

26 Claims, 8 Drawing Figures

ONBOARD TIRE INFLATION SYSTEM

BACKGROUND OF THE INVENTION

1. Field of the Invention

This invention relates to onboard tire inflation systems and, in particular, to onboard tire inflation systems having means for eliminating the need for manual valves at each of the tires and for extending rotary seal life.

2. Description of the Prior Art

The use of onboard tire inflation monitoring and/or tire inflation/deflation varying systems is known in the prior art, especially for use in heavy duty vehicles, such as military vehicles, wherein the vehicle will be travelling over a variety of terrains, such as over-the-road, off-the-road and/or desert conditions, and it is desirable to change the tire inflation pressure, especially of the driving wheels. Typically, such systems utilize a remote pressure gauge in the vehicle cab whereby the operator can monitor tire inflation and/or utilize a switch or control member whereby tire inflation can be varied from the cab, preferably on the move, according to the type of terrain the vehicle is presently traversing. It is known that superior vehicle performance can be obtained in over-the-road conditions with a relatively high tire pressure (i.e. for example 75–95 PSI), in off-highway conditions with a relatively lower tire pressure (i.e. for example about 40 PSI) and in desert conditions with a much lower tire pressure (i.e. for example about 8–15 PSI). An inherent difficulty with prior art vehicle onboard tire pressure inflation/deflation systems has been the need for providing reliable rotary seals to the wheel hub and tire assembly which is, of course, rotating relative to the vehicle. The prior art devices have usually utilized rifle drilled axle shafts and/or housings and/or rotary seals on the outboard ends of the wheel end assemblies or at other relatively unprotected areas on the wheel end. These prior art structures were not totally satisfactory as rifle drilling of the various axle components is an expensive and difficult operation and might tend to weaken the drilled component and as the rotary seals, which are usually not as robust as the other axle wheel end components, were mounted on the outboard ends or other relatively unprotected areas of the axles and thus subject to abuse and damage. Additionally, in the known prior art systems, individual manually operated valves were required at each wheel end and/or unbalanced pressure was maintained at the rotating seals which reduces seal life, and, if the seals wear, results in continuous leaking of the system.

An example of an improved axle wheel end assembly for an onboard tire inflation system utilizing rotary seals which are located in relatively well protected inboard locations may be seen by reference to copending U.S. Ser. No. 370,656, filed Apr. 21, 1982, and assigned to the assignee of this invention, now U.S. Pat. No. 4,434,833.

SUMMARY OF THE INVENTION

In accordance with the present invention, the drawbacks of the prior art have been minimized to the extent that a vehicle onboard tire pressure monitoring and inflation/deflation control system is provided which is operable entirely from a remote location, such as from within the vehicle cab, and which requires no manually operated valves at the wheel ends to isolate the individual tires from the remainder of the system during steady state conditions (i.e. when the vehicle will be traversing a relatively consistent terrain) and which relieves all unbalanced pressure on the rotary seals during times the system is not operating (i.e. pressure not being monitored and/or varied), thus extending life of the rotary seals.

The above is accomplished by providing an onboard vehicle tire inflation/deflation control and monitoring system which allows complete control and monitoring from a remote location, such as from within the vehicle cab, includes an automatic valve fluidly interposed the rotary seals and the tires for fluidly isolating the tires from the system at times the system is not operating, and includes means for automatically venting (i.e. connecting to atmosphere) the supply line leading from the source of pressurized fluid to the rotary seals at times the system is not operating.

Accordingly, it is an object of the present invention to provide an improved onboard tire inflation system.

A further object of the present invention is to provide a new and improved onboard tire inflation system which allows monitoring and/or varying of tire inflation pressure entirely from the vehicle cab, which eliminates the need for manually operated isolation valves at each tire and which relieves unbalanced pressures at the rotary seals at such times as the inflation pressures are not being monitored and/or varied.

These and other objects and advantages of the present invention will become apparent from a reading of the description of the preferred embodiments taken in connection with the attached drawings.

DESCRIPTION OF THE PREFERRED EMBODIMENT

The term "onboard tire inflation system" as used herein is intended to include self-contained systems mounted to vehicles, usually heavy-duty trucks and the like, which allow the tire inflation pressure of certain axle ends, usually of the drive axles, to be selectively varied by the operator from a point remote from the wheel end, usually the vehicle cab, from an onboard source of pressurized fluid, usually the vehicle air system and/or stored compressed air and/or an accumulator. Such systems typically include a pressure gauge, permitting the operator to monitor, as well as vary, the tire inflation pressure of the drive tires of the vehicle from the remote location, usually allowing such monitoring and/or varying of inflation pressure while the vehicle is in motion.

The term "inboard" is used to mean the direction axially toward the center of an axle assembly while the term "outboard" is used to mean the direction axially away from an axle assembly.

For ease of understanding, the fluid conduits illustrated in FIGS. 1-6 are shaded if communicating with a pressurized member (i.e. the interior of the tire or the source of pressurized fluid) and are not shaded if communicating only with atmospheric pressure.

Figure 1:
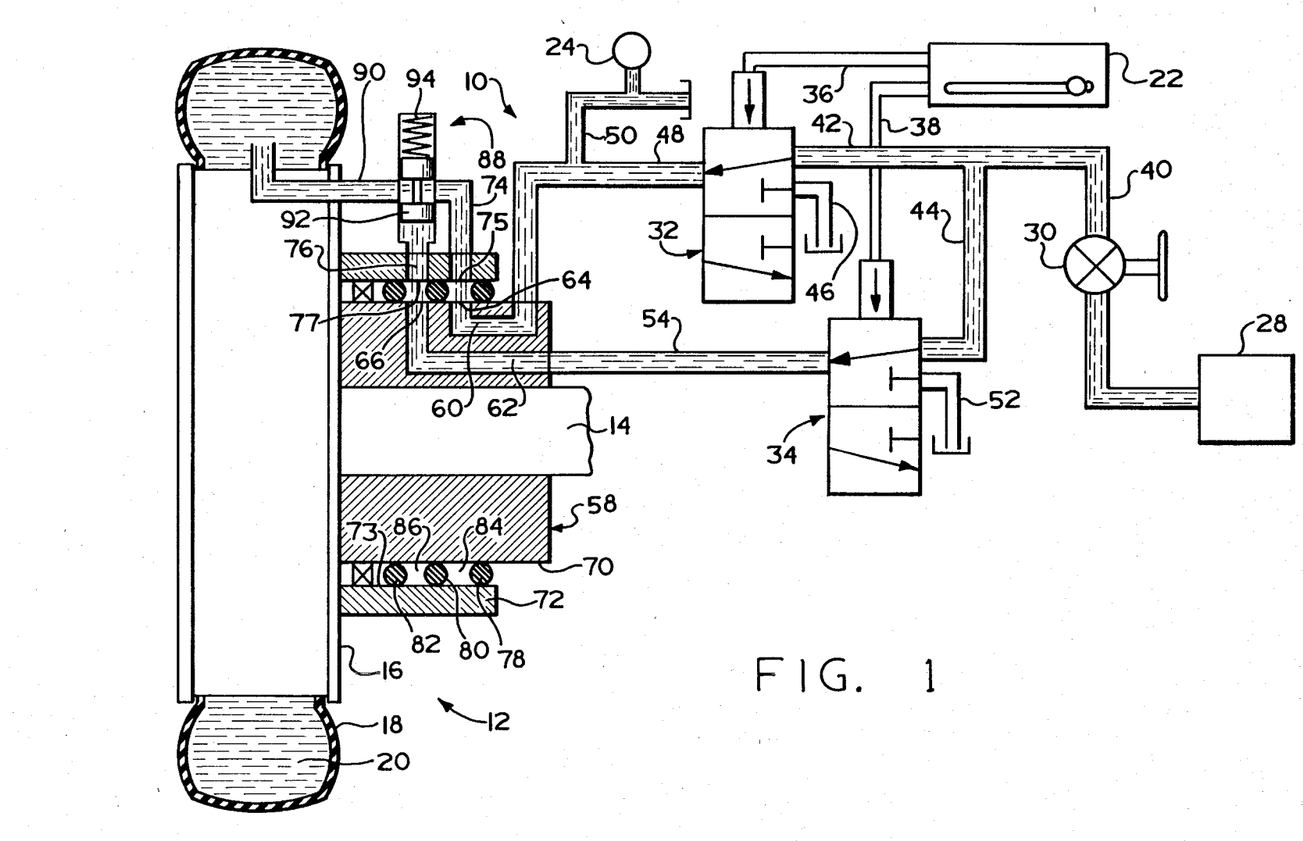
FIG. 1 is a schematic illustration of the onboard tire inflation system of the present invention in the tire inflation mode configuration thereof.
Figure 2:
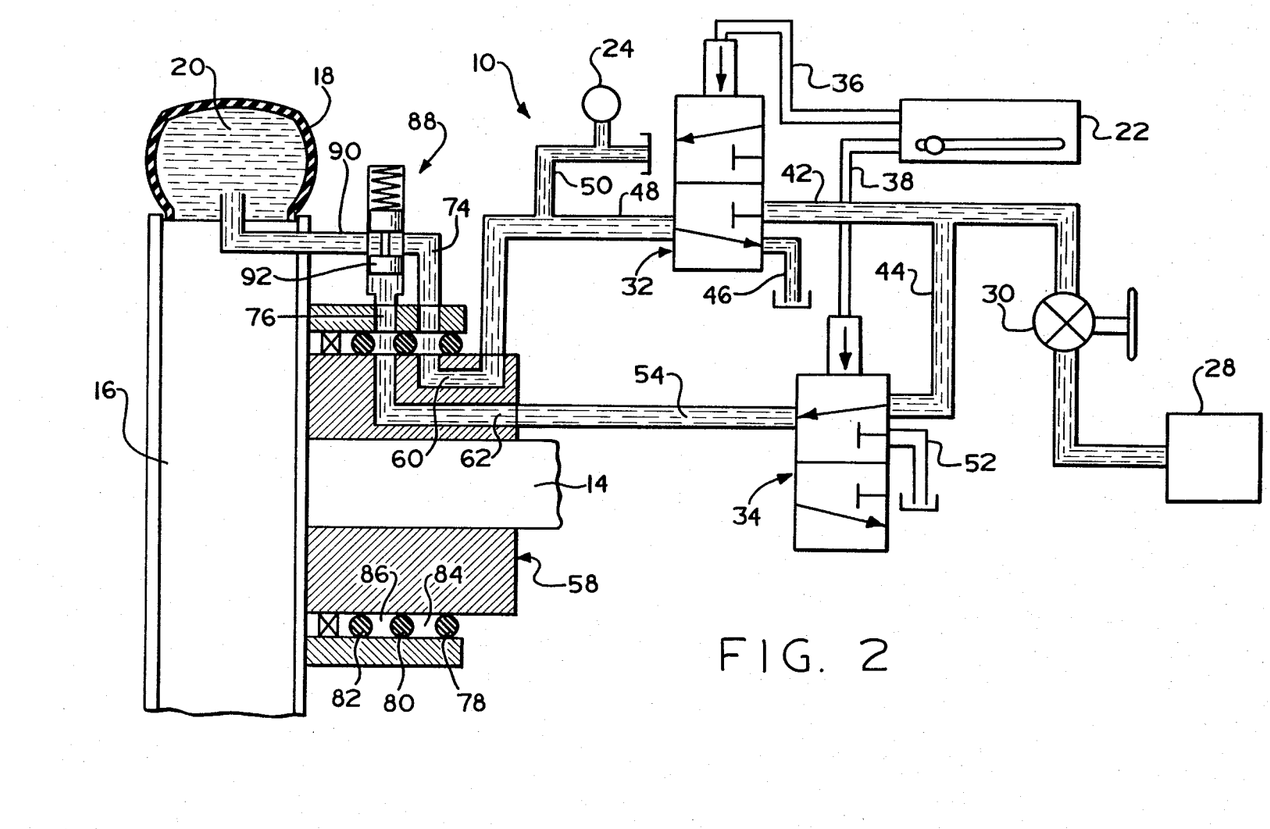
FIG. 2 is a schematic illustration of the onboard tire inflation system of FIG. 1 in the tire deflation mode configuration thereof.
Figure 3:
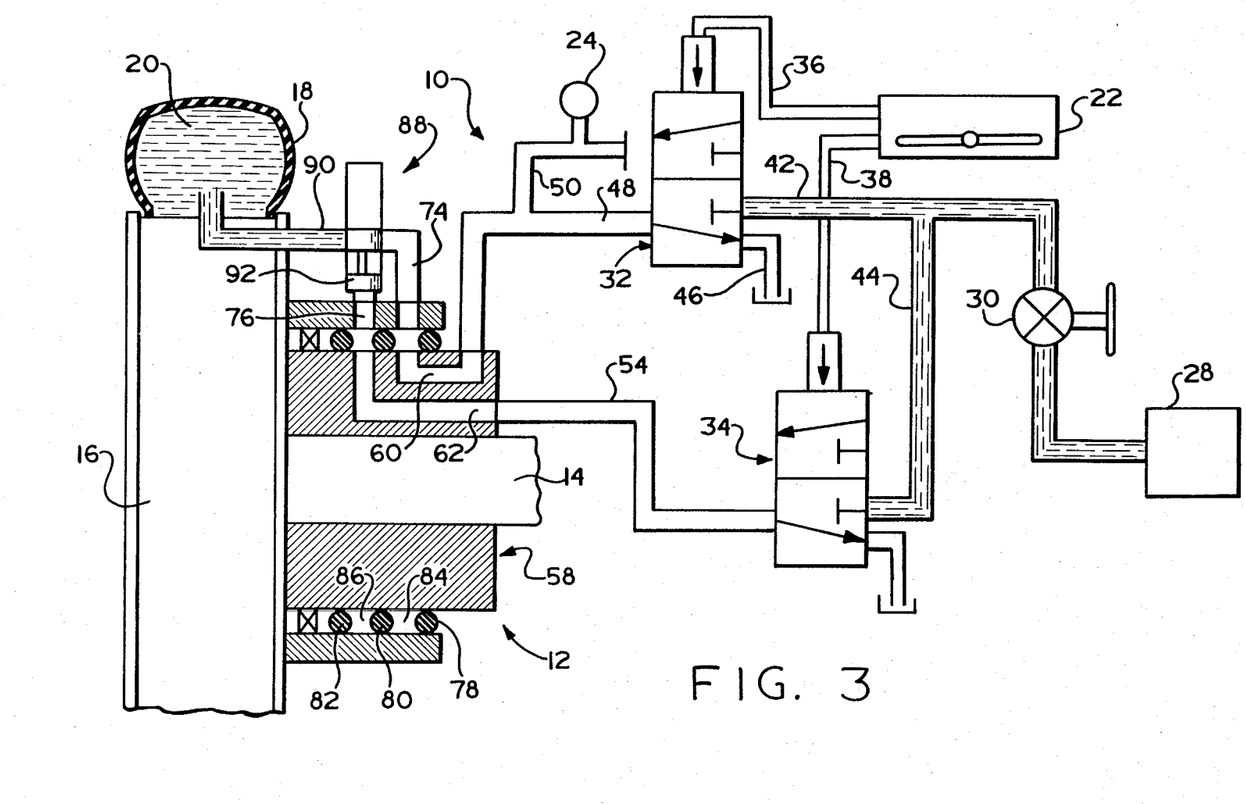
FIG. 3 is a schematic illustration of the onboard tire inflation system of FIG. 1 in the nonoperational (tire pressure not monitored nor varied) mode configuration thereof.

The onboard tire inflation system 10 of the present invention and a typical axle wheel end assembly 12, may be seen by reference to FIGS. 1-3. The wheel end assembly 12 includes an axle housing spindle end 14 on which is rotatably supported a hub and tire rim assembly 16 to which is mounted one or more inflatable tires 18. The tire 18, as is well known in the prior art, is mounted to the rim in a fluidly sealed manner to define an interior inflatable chamber 20. Typically, for a heavy duty vehicle in highway (i.e. over-the-road) conditions, it is desired that the driving tires be inflated to a pressure of about 75–95 lbs. per square inch (PSI), in off-the-road conditions, it is desired that the driving tires be inflated to a pressure of about 40 lbs. per square inch, and for desert operating conditions it is desired that the tires be inflated to a pressure of about 8–14 lbs. per square inch. Of course, other pressures and/or settings may be selected by the operator to achieve desired operating conditions for the vehicle.

The system 10 includes a remote operating control switch or lever assembly 22 and preferably a system pressure gauge or pressure display device 24 located adjacent the control assembly 22, preferably both in the vehicle cab. As may be seen by reference to FIG. 8, the control lever assembly 22 is provided with a control lever member 26, preferably in the form of a switch or lever, which is selectively movable from an "off" position to a "deflate" position or an "inflate and check" position. Preferably, the lever is spring biased to the "off" position. The pressure gauge 24 may be calibrated in absolute pressure values and may be additionally provided with indicia indicating the pressures or range of pressures appropriate for various vehicle operating conditions such as sand, mud, hard soil, pavement, or the like. Of course, other control lever configurations and/or pressure calibrations are possible within the scope of the present invention. The control assembly 22 and/or gauge 24 may be located at a remote location other than the vehicle operators cab.

The tire inflation system 10 also includes a source of pressurized fluid, usually pressurized air, 28 such as a vehicle air system, a reservoir of compressed gas and/or an accumulator or the like, a pressure regulator 30, a first three way/two position solenoid valve 32, and a second three way/two position solenoid valve 34. Solenoid valves 32 and 34 are connected to the control lever assembly 22 by means of electrical wires 36 and 38, respectively.

Fluid conduit 40 connects the source of pressurized fluid 28 to the pressure regulator 30 and branches into conduits 42 and 44 leading to the three way/two position valves 32 and 34, respectively. Two position valve 32 is also connected to an exhaust conduit 46 and to a fluid conduit 48 leading to the wheel end assembly 12. Fluid conduit 48 includes a monitoring conduit 50 leading to the pressure gauge 24. Two position valve 32 has a first position, as shown in FIG. 1, for connecting pressure line 48 to the source of pressurized fluid 28 via conduits 42 and 40 and a second position, as shown in FIGS. 2 and 3, for connecting fluid conduit 48 to exhaust conduit 46 and blocking conduit 42.

Two position valve 34 is connected to pressure source 28 by conduit 44, to an exhaust conduit 52 and to a control pressure conduit 54 leading to the wheel end assembly 12. Two position valve 34 has a first position, as seen in FIGS. 1 and 2, wherein control pressure line or conduit 54 is connected to the source of pressurized fluid 28 via conduits 44 and 40 and a second position, as seen in FIG. 3, wherein control conduit 54 is exhausted via exhaust conduit 52 and conduit 44 is blocked.

Valves 32 and 34 may be of any conventional construction and may be operated by fluid pressure and/or mechanical means as well as electrically as is shown. The source of pressurized fluid 28, the pressure regulator 30 and the three way/two position solenoid valves 32 and 34 are preferably of well known commercially available design and the specific structure thereof forms no part of the present invention.

An axially extending sleeve 58 is fixed to the axle housing spindle end 14 at the outboard end thereof, and is provided with passages 60 and 62, respectively, forming continuations of the conduit 48 and control conduit 54, respectively. Passages 60 and 62 are provided with axially spaced apart openings, 64 and 66, respectively, at the radially outer periphery 70 of the sleeve 58. Passages 60 and 62, and openings 64 and 66 could be formed directly on the spindle end 14.

A generally annular axially inwardly extending sleeve poriton 72 of the hub defines an annular inner diameter surface 73 which surrounds the outer periphery 70 of the sleeve 58 in a radially spaced apart telescopic manner for rotation relative thereto. Sleeve 72 of the hub carries a first fluid conduit 74 and a second fluid conduit 76 which are provided with openings, 75 and 77, respectively, which open to surface 73 and are generally axially aligned with openings 64 and 66, respectively, of passages 60 and 62, respectively, provided in the sleeve member 58. Three annular seal members, such as "O" rings or lip seals or the like, are sealingly received between the outer periphery 70 of sleeve 58 and the inner diameter surface 73 of annular sleeve portion 72 of the hub assembly 16 to define sealed annular pressure chambers 84 and 86 therebetween. Openings 64 and 75 of passage 60 and conduit 74 are both in fluid communication with chamber 84 while, openings 66 and 77 of passage 62 and conduit 76 are both in fluid communication with annular pressure chamber 86. Accordingly, seal member 78, 80 and 82 are the rotary seal assembly of the onboard tire inflation system 10 of the present invention. Preferably, the seal members 78, 80 and 82 are of a known commercially available design and the specific design and/or material thereof forms no part of the present invention.

As is well known in axle design, an axle shaft (not shown) is drivingly connected to the hub and rim assembly 16 to provide driving torque to the rim assembly 16 and tire 18 carried thereby.

Conduit 74 is connected to the inlet of a two way/two position spring biased normally closed pilot valve 88, which is also connected via conduit 90 to the pressurizable interior chamber 20 of tire 18. The normally closed two position pilot valve 88 includes a pilot piston 92 normally biased by biasing spring 94 to block communication between conduit 74 and conduit 90 for isolating the interior chamber 20 of tire 18 from the remainder of the inflation system 10, and which piston 92 is acted upon by fluid pressure in pilot conduit 76, when said conduit is in fluid communication with the source of pressurized fluid 28 at the regulated pressure thereof, to move the piston 92 against the bias of the spring 94 to establish fluid communication between conduit 90 and conduit 74. The structure of two position pilot valve 88 is preferably of a known commercial design and forms no part of the present invention.

The operation of onboard tire inflation system 10 is as follows. To monitor and/or increase the inflation pressure of the one or more tires 18 connected to the onboard tire pressure monitoring system 10, the control lever or switch 26 is moved to the "inflate (check)" position of control assembly 22, which results in the three way/two position valves 32 and 34 assuming the positions illustrated in FIG. 1 wherein conduit 48 and control conduit line 54 are both pressurized with the regulated pressure fluid from conduit 40 leading from the source of pressurized fluid 28 and the regulator 30. Additionally, exhaust conduits 46 and 52 will be blocked. Pressurization of conduit 54 and thus passage 62 will pressurize annular chamber 86, and thus pilot conduit 76 to move the piston member 92 of two way/two position isolation pilot valve 88 upwardly against the bias of the spring 94. In this position, valve 88 will place conduit 48 and passage 60 in fluid communication with conduit 74 and the interior chamber 20 of tire 18. Accordingly, pressure gauge 24, via conduit 50, will be in fluid communication with the interior chamber 20 of the tire 18 allowing the tire pressure to be monitored and that pressure may be increased, i.e., the tire may be increasingly inflated, to a desired inflation pressure. Of course, the maximum pressure to which tire 18 may be inflated is limited to the regulated pressure in conduit 48.

Figures 7, 8:
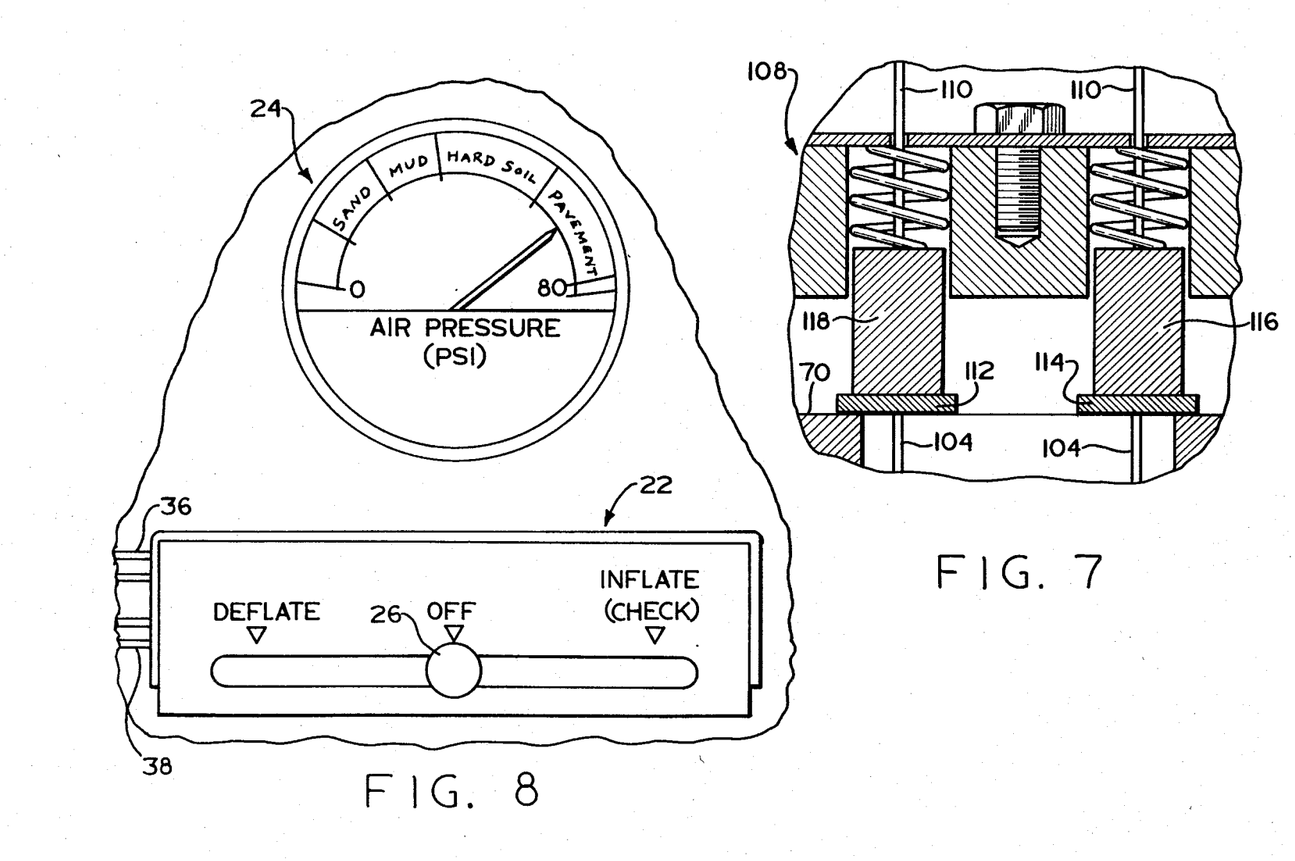
FIG. 7 is an enlarged view, in section, of the rotary electrical connection assembly utilized in the onboard tire inflation system of FIGS. 4–6.
FIG. 8 is a schematic illustration of a typical tire inflation pressure monitoring gauge and tire inflation/deflation control switch for use in connection with the onboard tire inflation systems of FIGS. 1 and 4.

When the monitored inflation pressure of chamber 20 of tires 18 is at a satisfactory level, or when operation of the vehicle is considered satisfactory and monitoring and/or varying of the inflated tire pressure is not required, the control lever 26 of control assembly 22 may be moved to the "off" position (as shown in FIG. 8) to which position the control lever 26 is spring biased. Movement of the lever 26 to the "off" position will result in the three way/two position valves 32 and 34 moving to the position shown in FIG. 3. In this position, three way/two position, valve 34 blocks conduit 44 and vents or exhausts control conduit 54 to exhaust conduit 52. Exhausting conduit 54 results in exhausting of conduit 76 allowing the spring biased piston 92 of isolation valve 88 to block communication between conduits 74 and 90, thus isolating the interior chamber 20 from the remainder of the system 10. In the "off" position of control 22, three way/two position valve 32 is moved to a position whereat conduit 42 connected to the regulated source of pressurized fluid is blocked and conduit 48 is vented to atmosphere via exhaust conduit 46. It is important to note that when the control 22 is set to the "off" position, conduit 90 is sealed by a spring biased pilot valve 88 for isolation of each individual tire 18 from the remainder of the system 10, and conduits 74 and 76, and passages 62 and 60 and chambers 84 and 86 are all exhausted via the exhaust conduits 46 and 52 and thus the rotary seal members 78, 80 and 82 are not exposed to unbalanced pressures, which unbalanced pressures tend to decrease the life of such seals. It is also important to note that in the event of a failure at the source of pressurized fluid 28 or in conduits 40, 42 44 or 54, passage 62, conduit 76, seal 80 or seal 82, the pilot valve 88 will automatically block communication of conduit 90 and conduit 74 to isolate the interior 20 of tire 18 retaining same at its existing level of pressurization. It is also important to note that if tire 18 fails while the system is in the "off" mode, fluid pressure will not be lost from the other (not shown) tires.

When deflation of the one or more tires 18 connected to the tire inflation system 10 of the present invention is required, such as when operation on off-the-road or desert conditions is expected, the control lever 26 of control assembly 22 is moved to the "deflate" position causing the three way/two position valves 32 and 34 to move to the positions shown in FIG. 2. In this position, three way/two position valve 34 blocks the exhaust conduit 52 and fluidly connects the control line pressure conduit 54 with the source of regulated pressurized fluid via conduit 44 causing the two position isolation valve 88 to fluidly communicate the interior 20 of tire 18 with pressure conduit 48 and monitoring pressure line 50 in the same manner as described above in connection with the operation of valve 34 in the "inflate" position. Three way/two position valve 32 will block conduit 42 connected to the regulated source of pressurized fluid and will connect conduit 48 to exhaust conduit 46 allowing the pressurized chamber 20 of tire 18 to be deflated (i.e. reduced in inflation pressure) to a desired inflation pressure at which time the control lever 26 will be moved to the "off" position and the system will return to the condition shown in FIG. 3 described above. It is noted that the pressure of the interior chamber 20 of tires 18 connected to the tire inflation system 10 may also be monitored in the "deflate" position, however, this is not considered as desirable as monitoring such pressure in the "inflate" position.

Figure 4:
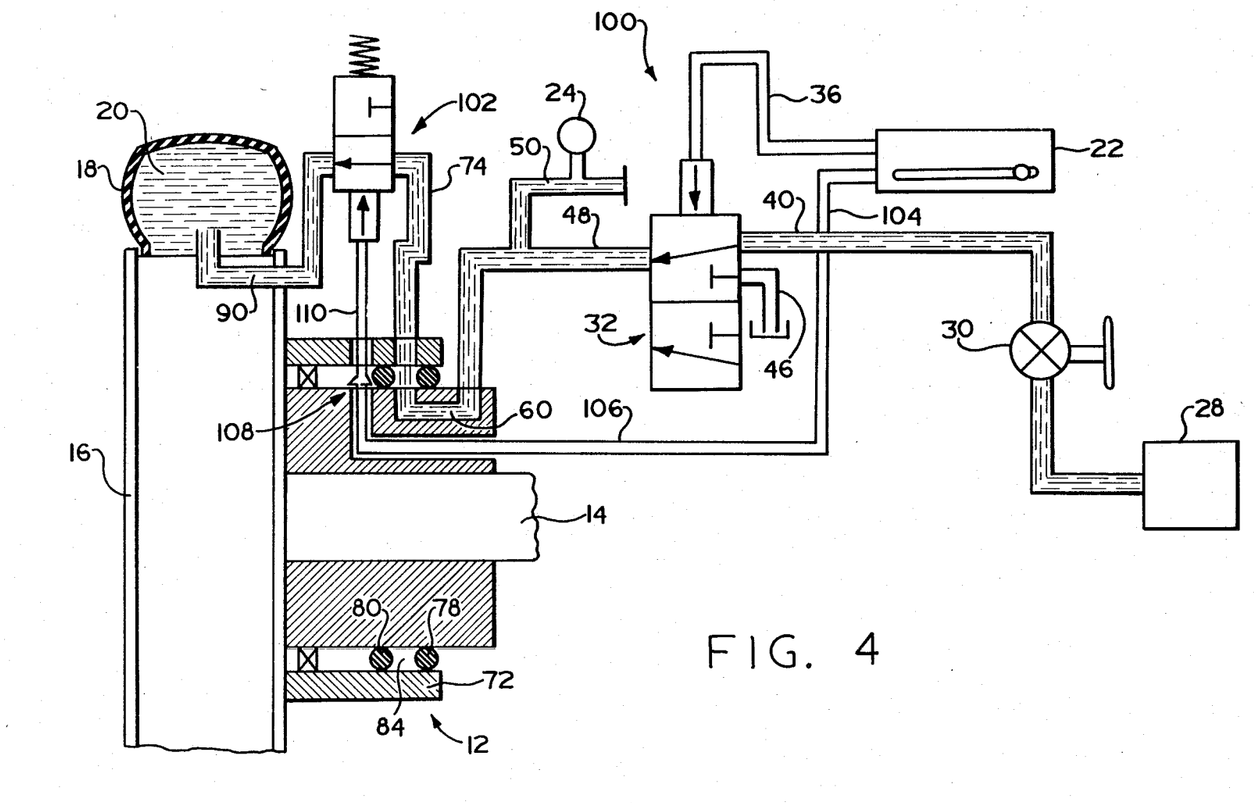
FIG. 4 is a schematic illustration of an alternate embodiment of the onboard tire inflation system of the present invention in the tire inflating mode of operation configuration thereof.
Figure 5:
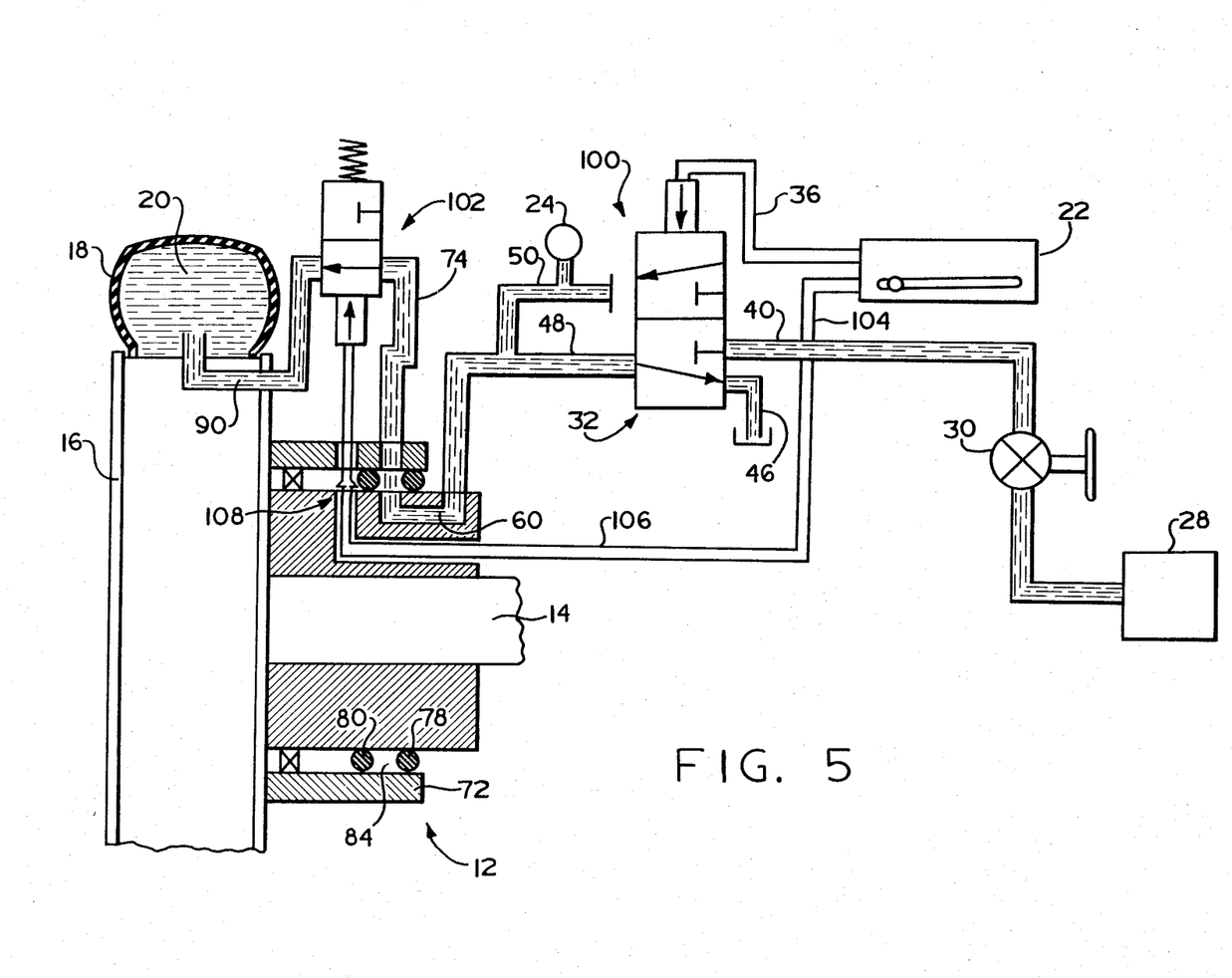
FIG. 5 is a schematic illustration of the onboard tire inflation system of FIG. 4 in the tire deflation mode of operation configuration thereof.
Figure 6:
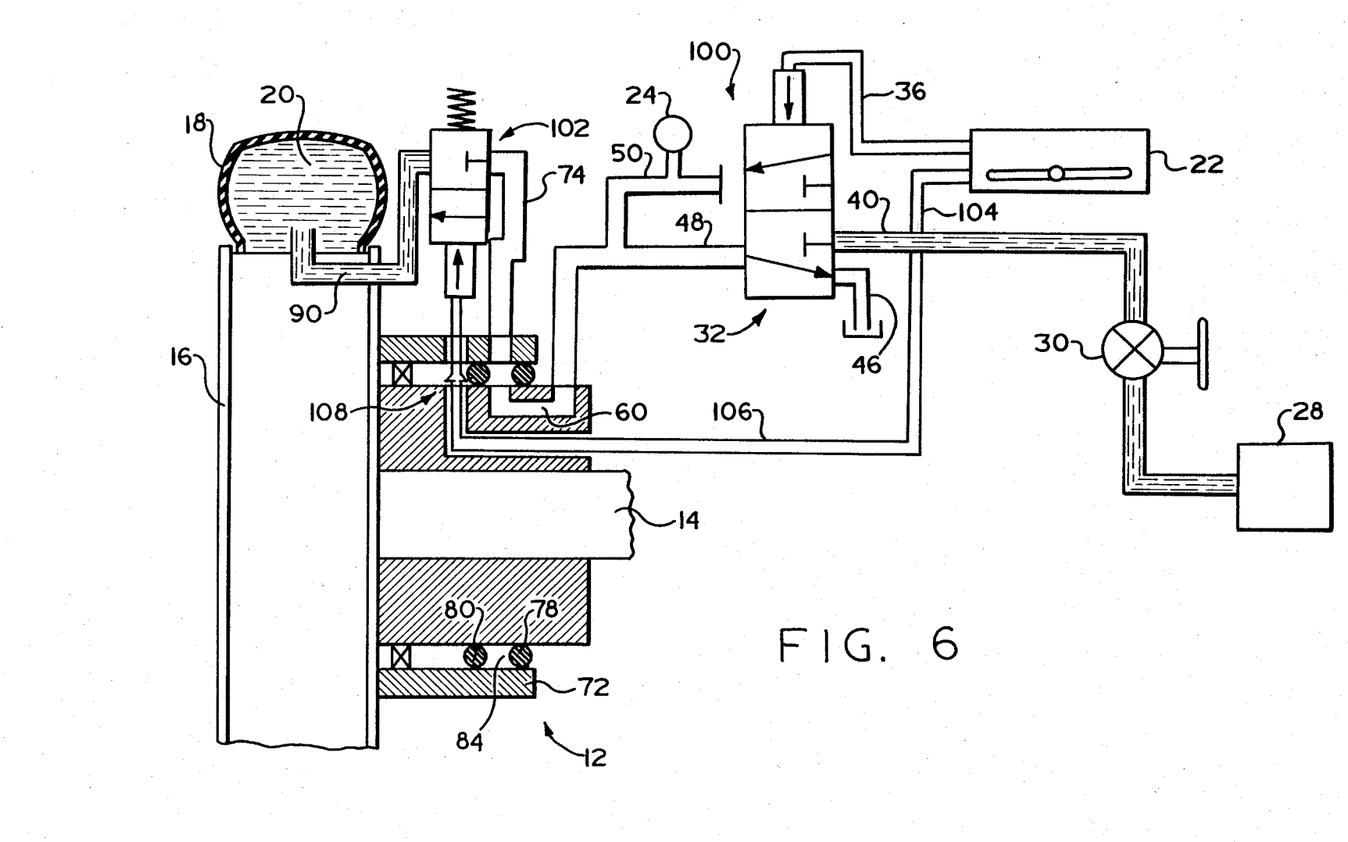
FIG. 6 is a schematic illustration of the onboard tire inflation system of FIG. 4 in the nonoperational configuration thereof.

An alternate embodiment 100 of the onboard tire inflation system may be seen by reference to FIGS. 4–6. Many components of inflation system 100 are structurally and/or functionally identical or substantially identical to components utilized in system 10 described above and are assigned like reference numerals.

System 100 utilizes a source of pressurized fluid 28, a pressure regulator 30, a three way/two position solenoid valve 32 connected directly to conduit 40, conduit 48, a monitoring conduit 50 fluidly communicating with conduit 48 and, a pressure gauge 24, the structures, functions and operation of which are similar or identical to that described above in connection with system 10. System 100 also utilizes sleeve 58 fixed to the axle housing 14, which sleeve includes a passage 60 connected to the conduit 48 and two annular rotary seal members 78 and 80 in sealing contact with a sleeve portion 72 of the hub to define a sealed annular chamber 84, therebetween. A conduit 74 is carried by the wheel hub sleeve 72 and is fluid communication with a two way/two position solenoid valve 102, to be described in greater detail below. A fluid conduit 90 communicates the interior pressurized chamber 20 of tire 18 and the two position two way solenoid valve 102.

A pair of electrical wires or conduits 104 extend from the control assembly 22 to the wheel end 12 of the axle housing 14 and through a passage 106 in the sleeve member 58. The solenoid valve wires 104 terminate on the outer periphery 70 of sleeve member 58 in a rotary contact assembly 108 carried by the sleeve members 58 and 72 from which rotary contact assembly 108 extends solenoid wires or conduits 110 leading to the two way/two position solenoid valve 102.

Briefly, as seen in FIGS. 4, 5 and 6, respectively, three way/two position solenoid valve 32 will assume the same positions for the "inflate", "deflate" and "off" positions, respectively, of control lever 26 as described above for system 10 and illustrated in FIGS. 1, 2 and 3, respectively. Two way/two position solenoid valve 102 replaces the three way/two position solenoid valve 34 and the two way/two position pilot operated isolation valve 88 utilized in system 10 described above and will assume a first position, see FIGS. 4 and 5, for fluidly connecting the interior 20 of tire 18 to the conduit 48 in both the "inflate" and "deflate" positions of control lever 26 of control 22 and will assume a second closed position to block fluid communication between conduits 74 and 90 to fluidly isolate the tires 18 of the system in the "off" position or setting of control lever 26.

The two way/two position solenoid valve 102 is preferably of a known commercially available design and a specific structure thereof forms no part of the present invention.

The details of rotary contact assembly 108 may be seen in greater detail by reference to FIG. 7. A pair of contact rings 112 and 114 are carried on exterior surface 70 of sleeve 58 and electrically connected to the solenoid electrical wires 104. A pair of spring biased brushes 116 and 118 are carried by the hub sleeve 72 and spring biased radially inwardly for contact with the contact rings 112 and 114, respectively. Solenoid wires 110 are electrically connected to the spring biased brushes 116 and 118 and extend to the two way/two position solenoid valve 102.

It may thus be seen that an onboard tire inflation system allowing the tire inflation pressure of one or more inflatable tires 18 to be monitored and/or selectively varied from a remote control, 24 and 26, is provided. The system 10 or 100, when in a selectable "off" position thereof (when monitoring and/or varying of tire inflation pressure is not required), will isolate each individual tire from the system, will relieve all unbalanced pressures from the rotary seals to improve the life thereof, and requires no manually operated valve at each tire assembly.

It is also noted that the rotary seal members, and the electrical contact means if utilized, are provided at an inboard, protected location to minimize damage thereto.

It is understood that the above description of the preferred embodiments is by of example only and that various modifications of the structure and rearrangement of the components is possible without departing from the spirit and the scope of the invention as hereinafter claimed.

I claim:

1. An onboard tire inflation system for remotely controlling the inflation pressure of at least one inflatable tire, said system comprising:

an axle wheel end assembly comprising an axle housing spindle end having a first fluid passage therein opening to an exterior surface thereof, a wheel hub and rim assembly rotatably supported on said axle housing spindle end, said tire sealingly mounted on said wheel hub and rim assembly to define a selectively pressurized interior tire chamber, a second fluid passage in said wheel hub and rim assembly leading from said interior tire chamber to an exterior surface of the hub and rotary seal means associated with said axle housing spindle end and said hub defining a seal chamber establishing constant fluid communication between said first and second fluid passages;

an onboard source of pressurized fluid;

a third fluid passage fluidly connecting said source and said first fluid passage;

first valve means connected in series in said third fluid passage interposed said source and said first fluid passage, said first valve means having a first position for fluidly connecting said first passage and said source and a second position for sealing said source from said first passage and connecting said first passage to an exhaust;

second valve means mounted on said hub and connected in series in said second passage interposed said interior tire chamber and said seal chamber, said second valve having a first open position establishing fluid communication between said interior tire chamber and said seal chamber and a second closed position blocking fluid communication between said interior tire chamber and said seal chamber; and a control member remote from said wheel end assembly having a selectable first setting for increasing the inflation pressure of said tire, a selectable second setting for decreasing the inflation pressure of said tire and a selectable third setting for maintaining the existing inflation pressure of said tire, said control member operating said first and second valves whereby in said first setting said first and second valves are in said first positions thereof, in said second setting said first valve is in said second position thereof and said second valve is in said first position thereof and in said third setting said first and second valves are in said second positions thereof.

2. The system of claim 1 additionally comprising a pressure indicating device located adjacent said control member and a fourth passage in fluid communication with said indicating device and with said third fluid passage at a point interposed said first valve means and said first fluid passage whereby inflation pressure of said tire may be monitored in said first and second settings of said control member.

3. The system of claim 2 wherein said second valve is biased to the second position thereof.

4. The system of claim 2 wherein said second valve is spring biased to the second position thereof.

5. The system of claim 4 wherein said second valve is a two way/two position pilot pressure operated valve.

6. The system of claim 4 wherein said second valve is a two way/two position solenoid valve.

7. The system of claim 4 wherein said control member includes a control switch movable to said first, second and third settings and said switch is biased to said third setting.

8. The system of claim 7 wherein said third setting is interposed said first and second settings.

9. The system of claim 5 additionally including a fifth fluid passage in said axle housing spindle end opening to an exterior surface thereof, a sixth fluid passage in said hub fluidly connecting the pilot port of said second valve to an exterior opening in said hub, said seal means defining a second seal chamber for establishing constant fluid communication between said fifth and sixth fluid passages, a seventh fluid passage fluidly connecting said fifth passage and said source and a third valve connected in series in said seventh fluid passage interposed said source and said fifth fluid passage, said third valve having a first position for establishing fluid communication between said source and said fifth fluid passage and a second position for sealing said source from said fifth fluid passage and fluidly connecting said fifth fluid passage to an exhaust, said control operating said third valve to assume said first position in the first and second settings and to assume said second position in the third setting.

10. The system of claim 6 additionally comprising a first electrical conduit extending from said control to an exterior surface of said spindle end, a second electrical conduit extending from said second valve to an exterior surface of said wheel hub and a rotary electrical connection assembly for establishing constant electrical contact between said first and second electrical conduits.

11. The system of claim 4 wherein a pressure regulator is interposed said first valve means and said source of pressurized fluid and operatively connected to said third fluid passages.

12. The system of claim 4 wherein said exterior surface of said spindle is an outer diameter annular surface adjacent the outboard end thereof, said hub defines an axially inboardly extending inner diameter surface telescopically surrounding and radially outwardly spaced from said spindle exterior surface, said inner diameter surface defining said hub exterior surface.

13. The system of claim 12 wherein said wheel end assembly includes a sleeve member fixed to said axle spindle end at the outboard end thereof, said first passage formed in said sleeve, said outer diameter surface defined by the outer diameter surface of said sleeve.

14. The system of claim 4 wherein said first valve is a three way/two position solenoid valve.

15. An improved onboard tire inflation system of the type comprising an axle housing spindle end, a wheel hub and rim assembly rotatably supported on said axle housing spindle end, an inflatable tire sealingly mounted on said wheel hub and rim assembly to define a sealed interior tire chamber, a first fluid passage fixed to said axle housing spindle end, a second fluid passage fixed to said wheel hub and rim assembly and fluidly communicating with said interior tire chamber, a rotary seal assembly establishing constant fluid communication between said first and second fluid passages, an onboard source of pressurized fluid, a control means located remotely from said hub assembly, said control means having a first setting for increasing pressurization of said tire, a second setting for decreasing pressurization of said tire and a third setting for maintaining existing pressurization of said tire and a first valve operated by said control means having a first position for fluidly connecting said first passage to said source and a second position for connecting said first passage to an exhaust, the improvement comprising:

a second valve carried by the hub and connected in series in said second passage interposed said interior tire chamber and said rotary seal assembly, said second valve operated by said control means and having a first position for establishing fluid communication between said interior tire chamber and said first fluid passage and a second position for blocking fluid communication between said interior tire chamber and said first fluid passage, said control in the third setting thereof effective to cause said first and second valves to assume the second positions thereof whereby said interior tire chamber is fluidly isolated and said seal assembly is not subjected to unbalanced fluid pressures.

16. The improved system of claim 15 wherein said second valve is resiliently biased to the second position thereof.

17. The improved system of claim 16 additionally comprising a third fluid passage fluidly communicating with said first fluid passage at a connection interposed said first valve and said rotary seal assembly and a pressure gauge located adjacent said control means and fluidly communicating with said third fluid passage whereby interior tire chamber inflation pressure may be monitored in the first and second settings of said control means.

18. The improved system of claim 15 wherein said control means in the first setting causes said first and second valves to assume the first positions thereof and said control means in the second setting causes said first valve to assume the second position thereof and said second valve to assume the first position thereof.

19. The improved system of claim 18 wherein said control means includes a control member movable to said first, second and third settings, said control member biased to the third setting.

20. The improved system of claim 17 wherein said hub assembly defines an annular inner diameter surface extending axially inboardly from the inboard side of said tire, said inner diameter surface radially spaced from and telescopically surrounding an annular outer diameter surface defined by said axle housing spindle end, said rotary seal assembly located in the annular space between said inner and outer diameter surfaces.

21. The improved system of claim 20 wherein said seal assembly comprises a first and a second axially spaced apart annular seals sealingly engaged with both said inner and outer diameter surfaces to define said seal chamber therebetween.

22. The improved system of claim 21 wherein said first passage opens to said outer diameter surface at an axial location interposed said first and second seals and said second passage opens to said inner diameter surface at an axial location interposed said first and second seals.

23. An onboard tire inflation system for remotely controlling the inflation pressure of at least one inflatable tire, said system comprising:

an axle wheel end assembly comprising an axle housing spindle end having a first fluid passage therein opening to an exterior surface thereof, a wheel hub and rim assembly rotatably supported on said axle housing spindle end, said tire sealingly mounted on said wheel hub and rim assembly to define a selectively pressurized interior tire chamber, a second fluid passage in said wheel hub and rim assembly leading from said interior tire chamber to an exterior surface of the hub and rotary seal means associated with said axle housing spindle end and said hub defining a seal chamber establishing constant fluid communication between said first and second fluid passages;

an onboard source of pressurized fluid;

a third fluid passage fluidly connecting said source and said first fluid passage;

first valve means connected in series in said third fluid passage interposed said source and said first fluid passage, said first valve means having a first position for fluidly connecting said first passage and said source and a second position for sealing said source from said first passage and connecting said first passage to an exhaust;

second valve means mounted on said hub and connected in series in said second passage interposed said interior tire chamber and said seal chamber, said second valve having a first open position establishing fluid communication between said interior tire chamber and said seal chamber and a second closed position blocking fluid communication between said interior tire chamber and said seal chamber; and a control member remote from said wheel end assembly and having a plurality of selectable settings, said control having a first operational mode for increasing the inflation pressure of said tire, a second operational mode for decreasing the inflation pressure of said tire and a third operational mode for maintaining the existing inflation pressure of said tire, said control member operating said first and second valves whereby in said first operational mode said first and second valves are in said first positions thereof, in said second operational mode said first valve is in said second position thereof and said second valve is in said first position thereof and in said third operational mode said first and second valves are in said second positions thereof.

24. The system of claim 23 additionally including a sleeve member (58) received on said axle housing spindle end, said first passage formed in said sleeve.

25. The system of claim 23 wherein said exterior surface of said axle housing spindle end is an outer diameter annular surface adjacent the outboard end thereof, said hub defines an axially inboardly extending inner diameter surface telescopically surrounding and radially outwardly spaced from said spindle exterior surface, said inner diameter surface defining said hub exterior surface.

26. The system of claim 25 wherein said axle wheel end assembly includes a sleeve member fixed to said axle housing spindle end at the outboard end thereof, said first passage formed in said sleeve, said outer diameter surface defined by the outer diameter surface of said sleeve.

* * * * *